(12) United States Patent
Schmidt et al.

(10) Patent No.: US 6,390,240 B1
(45) Date of Patent: May 21, 2002

(54) METHOD AND DEVICE FOR LUBRICATING A MACHINE ESPECIALLY AN INTERNAL COMBUSTION ENGINE

(75) Inventors: Timo Schmidt, Stuttgart; Michael Wiesner, Fellbach; Martin Schulz, Plochingen, all of (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 09/596,523

(22) Filed: Jun. 19, 2000

(30) Foreign Application Priority Data

Jun. 19, 1999 (DE) .......................................... 199 28 139

(51) Int. Cl.⁷ ................................................. F01M 9/00
(52) U.S. Cl. ..................................... 184/6.3; 123/196 S
(58) Field of Search ................ 184/6.3, 6.4; 123/196 S, 123/196 R, 196 A; 137/246; 138/30; 222/256, 261, 263, 264

(56) References Cited

U.S. PATENT DOCUMENTS 5,465,810 A    11/1995  Peterson et al.
5,494,012 A  * 2/1996   Hagen ..................... 123/196 S
6,076,497 A  * 6/2000   Ferralli ................... 123/196 S

FOREIGN PATENT DOCUMENTS

JP              8-170587      *  7/1996

* cited by examiner

Primary Examiner—David Fenstermacher
(74) Attorney, Agent, or Firm—Klaus J. Bach

(57) ABSTRACT

A device for lubricating a machine comprises at least one pump or arranged in the oil circuit as well as a first oil tank for keeping a reserve of a first oil and a second oil tank for keeping a reserve of a second oil and temporarily storing an oil mixture. Oil lines are also provided between the oil tanks and the lubricating points. Furthermore, there is an oil sump for collecting the oil or oil mixture downstream of the lubricating points. Oil lines are provided between the oil sump and the two oil tanks. At least one first switching device is arranged in the oil lines, for opening or blocking the oil lines. Between the second oil tank and the first oil tank there is an oil line, which can be controlled by a second switching device. This device has the effect of improving the lubrication and extending the oil intervals.

21 Claims, 2 Drawing Sheets

METHOD AND DEVICE FOR LUBRICATING A MACHINE ESPECIALLY AN INTERNAL COMBUSTION ENGINE

CROSS REFERENCE TO RELATED APPLICATION

Priority is claimed with respect to German Application No. 199 28 139.4-12 filed in Germany on Jun. 19, 1999, the disclosure of which is incorporated herein by reference.

BACKGROUND OF THE INVENTION

The invention relates to a method and a device for lubricating a machine, especially an internal combustion engine.

U.S. Pat. No. 5,465,810 discloses an oil circuit with two different grades of base oil of different viscosities contained therein. Above a temperature limit, the two grades of oil can be mixed with each other to form an oil of the desired viscosity, which below (this temperature limit can be fractionated again into the two original grades of oil.

This prior art provides two separate oil reservoirs, each for receiving a grade of base oil, from which oil is taken, mixed temperature-dependently in the desired ratio and fed to the lubricating point. The oil flowing away from the lubricating point is collected, cooled in a heat exchanger and passed into a fractionating apparatus, in which the oil mixture is fractionated into its two grades of base oil. The two grades of base oil recovered in this way are fed to the respective oil reservoirs.

The disadvantage of this solution is the high expenditure for the arrangement of a separate fractionating apparatus and the necessity for the latter to be operated continuously.

As an alternative to this, this prior art publication describes an arrangement in which only one oil reservoir is provided, for simultaneously receiving two different grades of base oil of different viscosities and different relative densities. Above a temperature limit, the two grades of base oil can be mixed at least partially to form an oil mixture. Below a temperature limit, the oil mixture segregates and forms a two-layer oil reserve with a lower layer of oil of high relative density and high viscosity and an upper layer of oil of low relative density and low viscosity. Oil is taken from the upper region of the oil reserve for supplying the lubricating point. At lower temperatures, this oil is segregated oil of lower viscosity and at higher temperatures it is an oil mixture of the two grades of base oil of higher viscosity.

The disadvantage of this solution is the poor definiteness of the oil viscosity during warm operation, since in a transitional temperature range there is no complete or precise, definable mixing of the two grades of base oil. Furthermore, with simple means, for example in the form of a dipstick, only the total oil level, but not the proportionate amount of the two individual grades of base oil, can be determined.

The invention is based on the object of providing a method and a device for lubricating a machine, especially an internal combustion engine, by which the lubrication is adapted better to the operating state and the oil change intervals can be extended considerably.

SUMMARY OF THE INVENTION

By the method according to the invention, the machine in the cold state is lubricated with low-viscosity oil, for reducing friction and improved starting performance. For this purpose, an oil pump pumps a first oil of low viscosity in an oil circuit from a first oil tank to the lubricating points. The low-viscosity oil dripping from the lubricating points is collected in an oil sump and returned to the first oil tank. During this process, a second oil of higher viscosity is kept ready in a second oil tank. The first oil and the second oil have properties of such a kind that there is a limit temperature above which the first oil can mix with the second oil to form an oil mixture of average viscosity and, below the limit temperature, the oil mixture thus produced can be fractionated into the first oil and the second oil.

For suitable lubrication in the warm state, a machine needs an oil of higher viscosity than in the cold state. Therefore, according to the invention, in a way dependent on the warming up of the machine, when a predetermined switching temperature lying above the limit temperature is reached, the oil circuit is switched over by a first switching device in such a way that the second oil is fed from the second oil tank to the lubricating points, mixing with the residue of the first oil remaining in the machine to form an oil mixture of a higher viscosity than that of the first oil, the oil mixture is collected in the oil sump and is returned to the second oil tank, so that after a transitional time the second oil is replaced in the second oil tank by the oil mixture, which from then on is fed to the lubricating points.

After the machine has been switched off and cooled down, oil of lower viscosity is required again for lubricating the lubricating points for re-starting. Therefore, in the switched-off state of the machine, after cooling below the limit temperature the oil mixture in the second oil tank is fractionated into the first oil and the second oil. In an advantageous version of the method, this fractionation takes place automatically by using a first oil with a lower relative density than that of the second oil, so that an upper layer with the first oil and a lower layer with the second oil forms in the second oil tank. The first oil recovered in this way and located in the second oil tank is returned to the first oil tank, in that a connecting line between the second oil tank and the first oil tank is opened by means of a second switching device. In this case, the second oil remains in the second oil tank.

An advantageous version of the method consists in that the first oil, located in the second oil tank after fractionation has taken place, is returned to the first oil tank by means of a pressure gradient produced by a geodetic difference in height.

The oil circuit is preferably operated using two oil pumps, in that the oil or oil mixture is fed to the lubricating points of the machine by means of a first oil pump, and that the oil or oil mixture collected in the oil sump is returned to one of the two oil tanks by means of a second oil pump.

For precisely controlling the removal and return of oil or oil mixture from or to one of the two oil tanks, the removal of oil or oil mixture from one of the two oil tanks is advantageously controlled by means of a first switching device and the return of the oil or oil mixture to one of the two oil tanks is advantageously controlled by means of a third switching device. The switching devices may be controlled time-,viscosity- or oil-pressure-dependently and preferably temperature-dependently. The switching over of the first and third switching devices may take place independently of each other, but advantageously simultaneously.

In the device according to the invention, at least one switching device, preferably all the switching devices, is/are designed as thermostatic switches for the sake of a simple structural design.

Furthermore, for extending the oil change intervals, a condensate trap is provided in the oil line between the oil sump and the third switching device, as well as preferably a main-flow oil filter and optionally a secondary-flow oil filter.

To avoid overheating of the oil circuit in warm operation, as a consequence of which the lubrication deteriorates and the oil ages more rapidly due to decomposition processes, in an advantageous design of the device a heat exchanger is arranged between the third switching device and the second oil tank.

To achieve an adjusted oil mixture of the first oil and the second oil that is as precise as possible, it is desirable for as little of the first oil of lower viscosity as possible to remain in the machine after the cold-running phase. The oil sump is therefore preferably designed as a dry sump.

BRIEF DESCRIPTION OF THE DRAWING

Exemplary embodiments of the invention are explained in more detail below with reference to the drawing, in which.

DETAILED DESCRIPTION OF THE PREFERRED EMBODIMENTS

Figure 1:
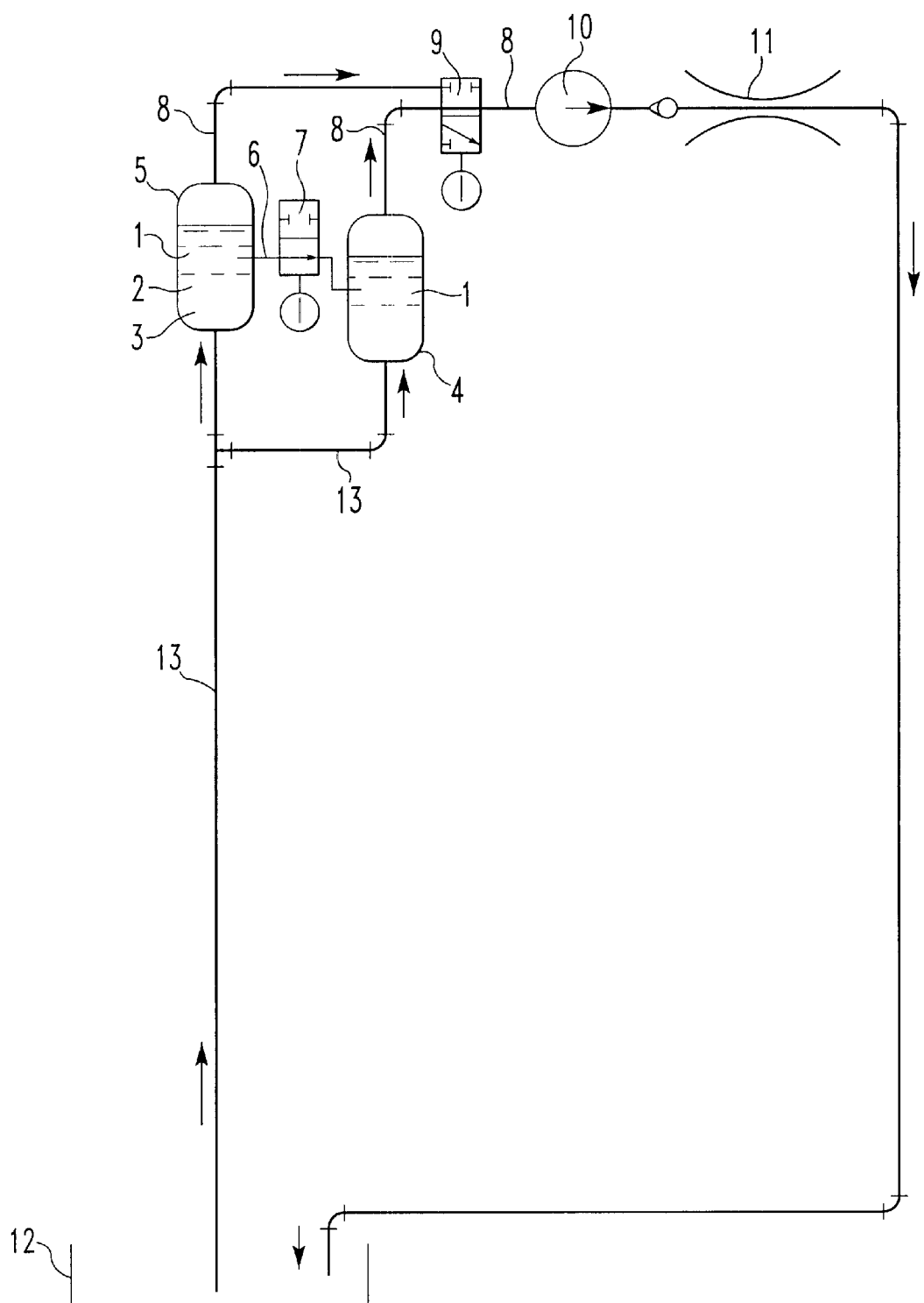
FIG. 1 shows a simply designed lubricating device in a schematic representation.

According to FIG. 1, in a preferred design of the device according to the invention a first oil tank 4 and a second oil tank 5 are arranged for an oil circuit, from which tanks a first oil 1, a second oil 2 or an oil mixture 3, comprising the first oil 1 and the second oil 2, is optionally taken and fed via oil lines 8 to the lubricating points 11. The oil 1 or 2 or oil mixture 3 dripping from the lubricating points 11 is collected in an oil sump and is returned to one of the two oil tanks 4 or 5 via the oil lines 13. The oil sump 12 may be a wet sump, but is preferably designed as a dry sump.

At least one oil pump 10 or 14 is required for operating the oil circuit. The said pump may be arranged upstream of the two oil tanks 4 and 5, in the direction of oil delivery, as an oil pump 14 according to FIG. 2. However, it is preferably provided, according to FIG. 1, as an oil pump 10 between the two oil tanks 4 and 5 and the lubricating point 11 in the oil line 8. When the oil circuit is operated with only one oil pump 10 or 14, the two oil tanks 4 and 5 are sealed from the surrounding atmosphere. As a result, the oil pump 10 can suck in the oil 1 or 2 or oil mixture 3 through one of the two oil tanks 4 or 5 from the oil pan, or else the oil pump 14 can deliver the oil 1 or 2 or oil mixture 3 through one of the two oil tanks 4 or 5 to the lubricating point 11. An advantageous design according to FIG. 2 also provides an oil pump 10 for removing oil 1 or 2 or oil mixture 3 from one of the two oil tanks 4 or 5 and also a further oil pump 14 for returning the oil 1 or 2 or oil mixture 3 collected in the oil sump 12 to one of the two oil tanks 4 or 5.

The selection of the first tank 4 or second tank 5 takes place by means of at least one switching device 9 or 18. It may be arranged upstream of the two oil tanks 4 and 5, in the direction of oil delivery, in the oil line 13 as switching device 18 according to FIG. 2. However, it is preferably provided according to FIG. 1 as switching device 18 between the two oil tanks 4 and 5 and the lubricating point 11 in the oil lines 8. An advantageous design according to FIG. 2 also respectively provides a switching device 9 for removing oil 1 or 2 or oil mixture 3 from one of the two oil tanks 4 or 5 and also a further switching device 18 for controlling the return of the oil 1 or 2 or oil mixture 3 to one of the two oil tanks 4 or 5. In this case, the switching devices 9 and 18 preferably form a jointly switching unit.

The first oil tank 4 contains the first oil 1 of lower viscosity for supplying the lubricating point 11 in cold operation. During this process, the second oil 2 of higher viscosity is kept in reserve in the second oil tank 5. Above a limit temperature, the first oil 1 and the second oil 2 can be mixed with each other to form an oil mixture 3, which below the limit temperature can be fractionated into the first oil 1 and the second oil 2.

Figure 2:
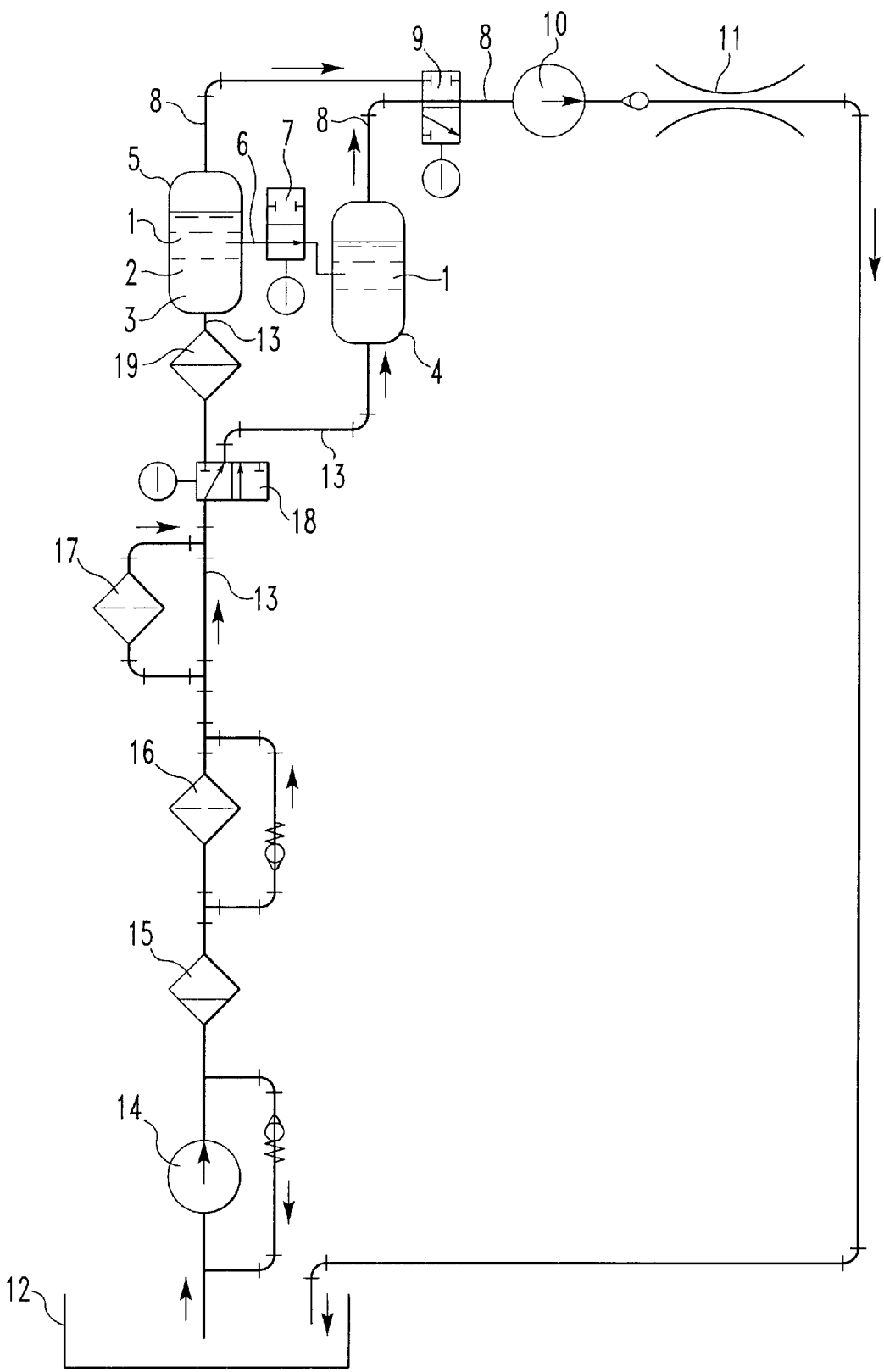
FIG. 2 shows a design variant of the device according to FIG. 1 with further additional components.

On reaching a switching temperature, which lies above the limiting temperature, according to FIG. 1 the switching device 9 or according to FIG. 2 the switching devices 9 and 18 switch over the oil circuit in such a way that initially the second oil 2 is delivered to the lubricating point 11. At the lubricating points 11 and in the oil sump 12, it mixes with the residue of the first oil 1 remaining there from cold operation to form an oil mixture 3 of an average higher viscosity than that of the first oil, desired at the operating temperature of the machine.

By returning the oil mixture 3 from the oil sump 12 to the second oil tank 5, after a transitional time the second oil 2 is replaced in the second oil tank 5 by the oil mixture 3, with which the lubricating point 11 is then supplied in warm operation.

After the machine has been switched off and cooled down below the limit temperature, the oil mixture 3 in the second oil tank 5 is fractionated into the first oil 1 and the second oil 2. This may take place by means of a fractionating apparatus arranged in the second oil tank 5. However, the fractionation preferably takes place without any further equipment automatically by use of a first oil 1 of a lower relative density than that of the second oil 2, with cooling causing an upper layer of the first oil 1 and a lower layer of the second oil 2 to form from the oil mixture 3.

The second oil tank 5 and the first oil tank 4 are connected by an oil line 6, which can be controlled by means of a second switching device 7 and is intended for returning the first oil 1, recovered during the fractionation in the second oil tank 5, to the first oil tank 4. Once fractionation has taken place, the switching device 7 opens the oil line 6. The first oil 1 recovered by the fractionation can then be returned by means of a pump to the first oil tank 4. However, the second oil tank 5 is preferably arranged with a geodetic difference in height with respect to the first oil tank 4, so that the pressure gradient produced causes the return to take place automatically.

The switching devices 7, 9 or 18 may be controlled time-, viscosity- or oil-pressure-dependently and are preferably temperature-controlled. They may be magnetically, pneumatically or hydraulically actuated valves. In particular, however, one of them, preferably all of them, is/are designed as thermostatic switches.

According to FIG. 2, a condensate trap is provided in the oil line 13 for conditioning the oil, in particular for extending the oil change intervals. Likewise arranged in the oil line 13 are a main-flow oil filter 15 and optionally a secondary-flow oil filter.

To avoid overheating of the second oil 2 or the oil mixture 3 after reaching the operating temperature of the machine, in the development according to the invention as shown in FIG. 2 a heat exchanger is provided between the third temperature-controlled switching device 18 and the second oil tank 5.

While the above description constitutes the preferred embodiment of the invention, it will be appreciated that the invention is susceptible to modification, variation, and change without departing from the proper scope or fair meaning of the accompanying claims.

What is claimed is:

1. A method for lubricating an internal combustion engine, comprising the following steps:

in the cold state of the engine, a first oil of low viscosity is fed by means of an oil pump from a first oil tank to various lubricating points, is collected in an oil sump and is returned to the first oil tank, during the supplying of the lubricating points with the first oil from the first oil tank, a second oil of higher viscosity is kept ready in a second oil tank, after the warming up of the engine to a predetermined switching temperature, the oil circuit is switched over by a first temperature-controlled switching device in such a way that the second oil is fed from the second oil tank to the lubricating points, it being mixed with the residue of the first oil remaining in the engine to form an oil mixture, is collected in the oil sump and is returned to the second oil tank, so that after a transitional time, the oil in the second oil tank is replaced by the oil mixture and then the oil mixture is fed to the lubricating points, after the engine has been shut down and has cooled down below a limit temperature, the oil mixture in the second oil tank is fractionated into the first oil and the second oil, once fractionation has taken place, a connecting line between the second oil tank and the first oil tank is opened by means of a second switching device and the first oil located in the second oil tank is returned via the said connecting line into the first oil tank, the second oil remaining in the second oil tank.

2. The method according to claim 1, wherein the fractionation of the oil mixture in the second oil tank takes place automatically when the temperature falls below a limiting temperature, as a result of the properties of the first oil of a lower relative density than the second oil.

3. The method according to claim 1, wherein, once fractionation has taken place, the first oil located in the second oil tank is returned to the first oil tank by means of a pressure gradient produced by a geodetic difference in height.

4. The method according to claim 1, wherein the oil or oil mixture is fed to the lubricating points by means of an oil pump, and in that the oil or oil mixture collected in the oil sump is returned to one of the two oil tanks by means of a further oil pump.

5. The method according to claim 1, wherein the selection of the first or second oil tank with regard to the removal of oil or oil mixture takes place by means of a first switching device, and in that the selection of the first or second oil tank with regard to the return of oil or oil mixture from the oil sump takes place by means of a third switching device.

6. The method according to claim 5, wherein the switching over of the first switching device takes place simultaneously with the third switching device.

7. The method according to claim 1, wherein the switching over of one switching device takes place in a temperature-controlled manner.

8. The method according to claim 7, wherein the switching over of the switching devices takes place in a temperature-controlled manner.

9. A lubricating system for an internal combustion engine having a plurality of lubricating points, an oil supply circuit for supplying oil to said lubricating points, at least one oil pump arranged in said oil circuit for pumping said oil, a first oil tank for containing a reserve of a first oil having a low viscosity, a second oil tank for containing a reserve of a second oil having a higher viscosity than said first oil and for temporarily storing a mixture of said first and second oils, said oil circuit including oil supply lines extending from first and second oil tanks to said lubricating points for supplying said low viscosity oil to said lubricating points upon starting said internal combustion engine and said higher viscosity oil from said second tank to said lubricating points upon warm-up of said engine, an oil sump for collecting the oil from said lubricating points, and oil return lines extending between said oil sump and said first and second oil tanks and including at least a first switching device for controlling the flow of said oil from said sump selectively through said first or said second tank, and a tank communication line extending between said first and second tanks and including a second switching device for controlling the return of said first oil from said second tank to said first tank after separation of said first and second oils in said second tank when the engine has been shut down.

10. A lubricating system for an internal combustion engine according to claim 9, wherein said first oil has a lower density than said second oil and said first tank is disposed at a lower level than said second tank and said communication line extends from an upper area of said second tank in which the first oil of lower density collects upon separation of the first and second oils, to said first tank for gravity flow of said first oil from said second tank to said first tank.

11. A lubrication system for an internal combustion engine according to claim 9, wherein said at least one oil pump includes a first oil pump disposed in said oil line from said first and second tanks to said lubricating points and a second oil pump disposed in said oil return line for returning said oil from said sump to said first and second tanks, respectively.

12. A lubrication system for an internal combustion engine according to claim 9, wherein said oil return line from said sump to said first and second tanks includes a third switching device for controlling the return oil flow selectively to one of said first and second tanks.

13. A lubrication system for an internal combustion engine according to claim 12, wherein at least one of said switching devices is a temperature-controlled switching device.

14. A lubrication system for an internal combustion engine according to claim 12, wherein a condensate trap is provided in said oil return line between said oil sump and said third switching device.

15. A lubrication system for an internal combustion engine according to claim 12, wherein a main flow oil filter is disposed in said oil return line between said oil sump and said third switching device.

16. A lubrication system for an internal combustion engine according to claim 15, wherein a secondary (by-pass) flow oil filter is disposed in said oil return line between said oil sump and said third switching device.

17. A lubrication system for an internal combustion engine according to claim 12, wherein a heat exchanger is disposed in the oil return line between said third switching device and said second tank.

18. A lubrication system for an internal combustion engine according to claim 9, wherein said first switching device and said second switching device are adapted to switch at the same temperature.

19. A lubrication system for an internal combustion engine according to claim 9, wherein at least said second switching device is a thermostatic switch.

20. A lubrication system for an internal combustion engine according to claim 19, wherein all of said switching devices are thermostatic switches.

21. A lubrication system for an internal combustion engine according to claim 9, wherein said oil sump is a dry sump.

* * * * *